(12) United States Patent
Medina, III et al.

(10) Patent No.: US 9,401,011 B2
(45) Date of Patent: Jul. 26, 2016

(54) SYSTEMS AND METHODS FOR REMOVING DEFECTS FROM IMAGES

(71) Applicant: United Services Automobile Association (USAA), San Antonio, TX (US)

(72) Inventors: Reynaldo Medina, III, San Antonio, TX (US); Bharat Prasad, San Antonio, TX (US)

(73) Assignee: UNITED SERVICES AUTOMOBILE ASSOCIATION (USAA), San Antonio, TX (US)

(*) Notice: Subject to any disclaimer, the term of this patent is extended or adjusted under 35 U.S.C. 154(b) by 223 days.

(21) Appl. No.: 13/917,256

(22) Filed: Jun. 13, 2013

(65) Prior Publication Data

US 2014/0003736 A1   Jan. 2, 2014

Related U.S. Application Data

(60) Provisional application No. 61/659,303, filed on Jun. 13, 2012.

(51) Int. Cl.
*G06T 5/00* (2006.01)
*G06K 9/00* (2006.01)
*G06K 9/40* (2006.01)

(52) U.S. Cl.
CPC ............ *G06T 5/005* (2013.01); *G06K 9/00442* (2013.01); *G06K 9/40* (2013.01); *G06K 2209/01* (2013.01); *G06T 2207/30176* (2013.01)

(58) Field of Classification Search
USPC .................................................. 382/254, 274
See application file for complete search history.

(56) References Cited

U.S. PATENT DOCUMENTS

| | | | | |
|---|---|---|---|---|
| 6,151,409 A | * | 11/2000 | Chen | G06T 9/005 382/166 |
| 6,873,728 B2 | * | 3/2005 | Bernstein | H04N 1/4097 348/246 |
| 8,369,650 B2 | * | 2/2013 | Zamfir | H04N 5/217 382/173 |
| 8,731,321 B2 | * | 5/2014 | Fujiwara | H04N 1/387 345/427 |
| 2003/0133608 A1 | * | 7/2003 | Bernstein | H04N 1/4097 382/163 |
| 2012/0099792 A1 | * | 4/2012 | Chevion | G06K 9/344 382/182 |

* cited by examiner

*Primary Examiner* — Ishrat I Sherali
(74) *Attorney, Agent, or Firm* — Baker & Hostetler LLP

(57) ABSTRACT

A method is described to increase the efficiency of the removal of defects from document images by reorienting the conceptual framework within which an image is filtered. Rather than arbitrarily applying a filter to an entire landscape of a document image, the disclosure describes a methodology by which a document image is separated into regions of darkness and regions of light, or viewed alternatively, regions of darkness and regions of lack of darkness. Filtering is then adaptively applied to each region to remove defects.

18 Claims, 18 Drawing Sheets

PATIENT REGISTRATION FORM

PATIENT INFORMATION

| Last Name | First | MI | Female ( ) Male ( ) | Birth Date | Home Phone # |
|---|---|---|---|---|---|
| Address | | Apt # | City | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | Cell Phone # | E-Mail | | | |

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | Cell Phone # | E-Mail | | | |

INSURANCE

Primary Insurance - Name & Address

| Policy # | Group # | Effective Date | Relationship to patient |
|---|---|---|---|
| Policy Holder Name | | DOB | S.S. # |

Secondary Insurance - Name & Address

| Policy # | Group # | Effective Date | Relationship to patient |
|---|---|---|---|

Signature of Patient/Parent/Legal guardian _____ Date _____

FIG. 4B

PATIENT REGISTRATION FORM

PATIENT INFORMATION

| Last Name | First | MI | Female ( ) Male ( ) | Birth Date | Home Phone # |
|---|---|---|---|---|---|
| Address | | Apt # | City | State | Zip |

Do any other family members come to this office?   Yes ( )  No ( )  Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | | Apt # | City | State | Zip |
| S.S. # | Employer | | | Marital Status | |
| Work # | Cell Phone # | | E-Mail | | |

PATIENT/GUARDIAN #2

| Last Name | First | MI | Female ( ) Male ( ) | Home Phone # | Birth Date |
|---|---|---|---|---|---|
| Address | | Apt # | City | State | Zip |
| S.S. # | Employer | | | Marital Status | |
| Work # | Cell Phone # | | E-Mail | | |

INSURANCE

Primary Insurance - Name & Address

| Policy # | Group # | Effective Date | Relationship to patient |
|---|---|---|---|
| Policy Holder Name | | DOB | S.S. # |

Secondary Insurance - Name & Address

| Policy # | Group # | Effective Date | Relationship to patient |
|---|---|---|---|

Signature of Patient/Parent/Legal guardian _____ Date _____

FIG. 5A

| 5A | 5B | 5C | 5D | 5E | 5F | 5G | 5H |

PATIENT REGISTRATION FORM

502

| PATIENT INFORMATION | | | | | | |
|---|---|---|---|---|---|---|
| Last Name | First | MI | Female ( ) Male ( ) | Birth Date | Home Phone # | |
| Address | Apt # | City | | State | Zip | |
| Do any other family members come to this office? Yes ( ) No ( ) Patient Cell Phone # | | | | | | |
| Names/ages of all children in household | | | | | | |
| Emergency Contact other than parent(s)/guardian (name & #) | | | | | | |

| PATIENT/GUARDIAN #1 | | | | | | |
|---|---|---|---|---|---|---|
| Last Name | First | MI | Female ( ) Male ( ) | Home Phone # | Birth Date | |
| Address | Apt # | City | | State | Zip | |
| S.S. # | Employer | | | Marital Status | | |
| Work # | Cell Phone # | | | | | |

| PATIENT/GUARDIAN #2 | | | | | | |
|---|---|---|---|---|---|---|
| Last Name | First | | | | Phone # | Birth Date |
| Address | Apt # | City | | | | Zip |
| S.S. # | Employer | | | | Status | |
| Work # | Cell Phone # | | | | | |

| INSURANCE | | |
|---|---|---|
| Primary Insurance - Name & Addr | | |
| Policy # | Group # | Relationship to patient |
| Policy Holder Name | | # |
| Secondary Insurance - Name & A | | |
| Policy # | Group # | Relationship to patient |
| Signature of Patient/Parent/Legal | | Date _____ |

1
FIG. 5B    |5A|5B|5C|5D|5E|5F|5G|5H|

PATIENT REGISTRATION FORM

PATIENT INFORMATION

| Last Name | First | MI | Female ( ) Male ( ) | Birth Date | Home Phone # |
|---|---|---|---|---|---|
| Address | | Apt # | City | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | Cell Phone # | | E-Mail | | |

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | Cell Phone # | | E-Mail | | |

INSURANCE

Primary Insurance – Name & Address

| Policy # | Group # | Effective Date | Relationship to patient |
|---|---|---|---|
| Policy Holder Name | | DOB | S.S. # |

Secondary Insurance – Name & Address

| Policy # | Group # | Effective Date | Relationship to patient |
|---|---|---|---|

Signature of Patient/Parent/Legal guardian _____ Date _____

PATIENT REGISTRATION FORM

PATIENT INFORMATION

| Last Name | First | MI | Female ( ) Male ( ) | Birth Date | Home Phone # |
|---|---|---|---|---|---|
| Address | | Apt # | City | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | | Apt # | City | State | Zip |
| S.S. # | | Employer | | Marital Status | |
| Work # | | Cell Phone # | | E-Mail | |

PATIENT/GUARDIAN #2

| Last Name | First | MI | Female ( ) Male ( ) | Home Phone # | Birth Date |
|---|---|---|---|---|---|
| Address | | Apt # | City | State | Zip |
| S.S. # | | Employer | | Marital Status | |
| Work # | | Cell Phone # | | E-Mail | |

INSURANCE

| Primary Insurance - Name & Address | | | |
|---|---|---|---|
| Policy # | Group # | Effective Date | Relationship to patient |
| Policy Holder Name | | DOB | S.S. # |
| Secondary Insurance - Name & Address | | | |
| Policy # | Group # | Effective Date | Relationship to patient |

Signature of Patient/Parent/Legal guardian _____ Date: _____

| PATIENT REGISTRATION FORM ||||||
|---|---|---|---|---|---|
| Last Name | First | MI | Female ( ) Male ( ) | Birth Date | Home Phone # |
| Address | Apt # | City | | State | Zip |
| Do any other family members come to this office? Yes ( ) No ( ) Patient Cell Phone # ||||||
| Names/ages of all children in household ||||||
| Emergency Contact other than parent(s)/guardian (name & #) ||||||

PATIENT INFORMATION

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | | Cell Phone # | E-Mail | | |

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | | Employer | | Marital Status | |
| Work # | | Cell Phone # | E-Mail | | |

PATIENT/GUARDIAN #2

| Primary Insurance - Name & Address ||||
|---|---|---|---|
| Policy # | Group # | Effective Date | Relationship to patient |
| Policy Holder Name | | DOB | S.S. # |
| Secondary Insurance - Name & Address ||||
| Policy # | Group # | Effective Date | Relationship to patient |
| Signature of Patient/Parent/Legal guardian | | | Date |

INSURANCE

PATIENT REGISTRATION FORM

PATIENT INFORMATION

| Last Name | First | MI | Female ( ) Male ( ) | Birth Date | Home Phone # |

| Address | Apt # | City | State | Zip |

Do any other family members come to this office? Yes ( ) No ( ) Patient Cell Phone #

Names/ages of all children in household:

Emergency Contact other than parent(s)/guardian (name & #):

PATIENT/GUARDIAN #1

| Last Name | First | MI | Female ( ) Male ( ) | Home Phone # | Birth Date |

| Address | Apt # | City | State | Zip |

| S.S. # | Employer | Marital Status |

| Work # | Cell Phone # | E-Mail |

PATIENT/GUARDIAN #2

| Last Name | First | MI | Female ( ) Male ( ) | Home Phone # | Birth Date |

| Address | Apt # | City | State | Zip |

| S.S. # | Employer | Marital Status |

| Work # | Cell Phone # | E-Mail |

INSURANCE

Primary Insurance - Name & Address

| Policy # | Group # | Effective Date | Relationship to patient |

| Policy Holder Name | DOB | S.S. # |

Secondary Insurance - Name & Address

| Policy # | Group # | Effective Date | Relationship to patient |

Signature of Patient/Parent/Legal guardian _____ Date _____

FIG. 5F

PATIENT REGISTRATION FORM

PATIENT INFORMATION

| Last Name | First | MI | Female ( ) Male ( ) | Birth Date | Home Phone # |
|---|---|---|---|---|---|
| Address | | Apt # | City | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

INSURANCE

Primary Insurance - Name & Address

| Policy # | Group # | Effective Date | Relationship to patient |
|---|---|---|---|
| Policy Holder Name | | DOB | S.S. # |

Secondary Insurance - Name & Address

| Policy # | Group # | Effective Date | Relationship to patient |
|---|---|---|---|

Signature of Patient/Parent/Legal guardian     Date

PATIENT REGISTRATION FORM

PATIENT INFORMATION

| Last Name | First | MI | Female ( ) Male ( ) | Birth Date | Home Phone # |

| Address | Apt # | City | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |

| Address | Apt # | City | State | Zip |

| S.S. # | Employer | Marital Status |

| Work # | Cell Phone # | E-Mail |

PATIENT/GUARDIAN #2

| Last Name | First | MI | Female ( ) Male ( ) | Home Phone # | Birth Date |

| Address | Apt # | City | State | Zip |

| S.S. # | Employer | Marital Status |

| Work # | Cell Phone # | E-Mail |

INSURANCE

Primary Insurance - Name & Address

| Policy # | Group # | Effective Date | Relationship to patient |

| Policy Holder Name | DOB | S.S. # |

Secondary Insurance - Name & Address

| Policy # | Group # | Effective Date | Relationship to patient |

Signature of Patient/Parent/Legal guardian _____ Date _____

PATIENT REGISTRATION FORM

502 ... 502 ... 506

PATIENT INFORMATION

| Last Name | First | MI | Female ( ) Male ( ) | Birth Date | Home Phone # |
|---|---|---|---|---|---|
| Address | Apt # | City | | State | Zip |

Do any other family members come to this office? Yes ( ) No ( ) Patient Cell Phone #

Names/ages of all children in household:

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

→ Gaussian Blur

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

INSURANCE

Primary Insurance - Name & Address

| Policy # | Group # | Effective Date | Relationship to patient |
|---|---|---|---|
| Policy Holder Name | | DOB | S.S. # |

Secondary Insurance - Name & Address

| Policy # | Group # | Effective Date | Relationship to patient |
|---|---|---|---|

Signature of Patient/Parent/Legal guardian _____ Date _____

| 6A | 6B |

*406

PATIENT REGISTRATION FORM

| PATIENT INFORMATION | | | | | | |
|---|---|---|---|---|---|---|
| Last Name | First | MI | Female ( ) Male ( ) | Birth Date | Home Phone # | |
| Address | Apt # | City | | State | Zip | |
| Do any other family members come to this office? Yes ( ) No ( ) Patient Cell Phone # | | | | | | |
| Names/ages of all children in household | | | | | | |
| Emergency Contact other than parent(s)/guardian (name & #) | | | | | | |

| PATIENT/GUARDIAN #1 | | | | | |
|---|---|---|---|---|---|
| Last Name | First | MI | Female ( ) Male ( ) | Home Phone # | Birth Date |
| Address | Apt # | City | State | Zip | |
| S.S. # | Employer | | Marital Status | | |
| Work # | Cell Phone # | E-Mail | | | |

| PATIENT/GUARDIAN #2 | | | | | |
|---|---|---|---|---|---|
| Last Name | First | MI | Female ( ) Male ( ) | Home Phone # | Birth Date |
| Address | Apt # | City | State | Zip | |
| S.S. # | Employer | | Marital Status | | |
| Work # | Cell Phone # | E-Mail | | | |

| INSURANCE | | | | |
|---|---|---|---|---|
| Primary Insurance - Name & Address | | | | |
| Policy # | Group # | Effective Date | Relationship to patient | |
| Policy Holder Name | | DOB | S.S. # | |
| Secondary Insurance - Name & Address | | | | |
| Policy # | Group # | Effective Date | Relationship to patient | |

Signature of Patient/Parent/Legal guardian _____ Date _____

FIG. 7A    | 7A | 7B | 7C |

PATIENT REGISTRATION FORM

PATIENT INFORMATION

| Last Name | First | MI | Female ( ) Male ( ) | Birth Date | Home Phone # |
|---|---|---|---|---|---|
| Address | Apt # | City | | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | | Employer | | | Marital Status |
| Work # | Cell Phone # | | E-Mail | | |

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | | Employer | | | Marital Status |
| Work # | Cell Phone # | | E-Mail | | |

INSURANCE

| Primary Insurance - Name & Address | | | |
|---|---|---|---|
| Policy # | Group # | Effective Date | Relationship to patient |
| Policy Holder Name | | DOB | S.S. # |
| Secondary Insurance - Name & Address | | | |
| Policy # | Group # | Effective Date | Relationship to patient |

Signature of Patient/Parent/Legal guardian _____ Date _____

FIG.7B

| 7A | 7B | 7C |

PATIENT REGISTRATION FORM — 706

PATIENT INFORMATION

| Last Name | First | MI | Female ( ) Male ( ) | Birth Date | Home Phone # |
|---|---|---|---|---|---|
| Address | Apt # | City | | State | Zip |

Do any other family members come to this office? Yes ( ) No ( ) Patient Cell Phone #

Names/ages of all children in household

Emergency Contact other than parent(s)/guardian (name & #)

PATIENT/GUARDIAN #1

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

PATIENT/GUARDIAN #2

| Last Name | First | MI | Female ( ) Male ( ) | Home Phone # | Birth Date |
|---|---|---|---|---|---|
| Address | Apt # | City | | State | Zip |
| S.S. # | Employer | | | Marital Status | |
| Work # | Cell Phone # | E-Mail | | | |

INSURANCE

Primary Insurance - Name & Address

| Policy # | Group # | Effective Date | Relationship to patient |
|---|---|---|---|
| Policy Holder Name | | DOB | S.S. # |

Secondary Insurance - Name & Address

| Policy # | Group # | Effective Date | Relationship to patient |
|---|---|---|---|

Signature of Patient/Parent/Legal guardian _____ Date _____

FIG. 7C

| 7A | 7B | 7C |

SYSTEMS AND METHODS FOR REMOVING DEFECTS FROM IMAGES

AMENDED APPLICATION

In response to the Notice to File Corrected application Papers mailed Jul. 15, 2013, Applicants respectfully submits the corrected application in its entirety. Applicants respectfully submit that no new matter has been added.

FIELD OF THE INVENTION

The present invention relates to image processing, and more particularly, to computer methods and systems for removing defects from document images.

BACKGROUND OF THE INVENTION

The widespread adoption of multifunctional mobile communications devices by individuals and enterprises has made it possible to move many business functions into the mobile realm. For instance, banks provide users with mobile phone applications that allow the users to deposit checks by photographing the check and then sending the image to the bank through a wireless mobile communications interface. It would be worthwhile if users could use mobile technology to transfer other types of business documents as well. Unfortunately, this has proven difficult because images taken from mobile devices are not always of sufficient quality to allow recipients to extract data accurately therefrom.

Photographs taken from mobile devices typically have defects introduced by factors such as lighting, shadow, and the ability of the user to take a clean photo. Without correction, these defects negatively affect the accuracy of data extraction. Therefore, prior to performing data extraction, recipients of documents must remove defects. In the case of checks, this is not overly burdensome because checks are small and have a limited amount of information fields from which data requires extraction (e.g. name, account number, routing number, etc.) However, larger documents create problems of scale. Larger documents have more data to extract and correspondingly more defects to remove. Removing a large number of defects greatly increases the time and processing power needed to extract information from larger documents. This has made it impractical to use mobile devices as an efficient means of capturing documents for later information extraction.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein:

FIGS. 4A and 4B illustrate preprocessing, including the extraction and dewarping of a document image;

FIGS. 5A and 5H illustrate the division of the extracted and dewarped image of FIG. 4 into bit planes;

FIGS. 6A and 6B illustrate a target bit plane both before and after application of a Gaussian blur and FIGS. 7A and 7C illustrate images of FIGS. 4A and 4B both before and after the application of the method of FIG. 3 and the comparison thereof to a conventional defect removal technique.

A component or a feature that is common to more than one drawing is indicated with the same reference number in each of the drawings.

DETAILED DESCRIPTION OF CERTAIN EMBODIMENTS

Figure 1:
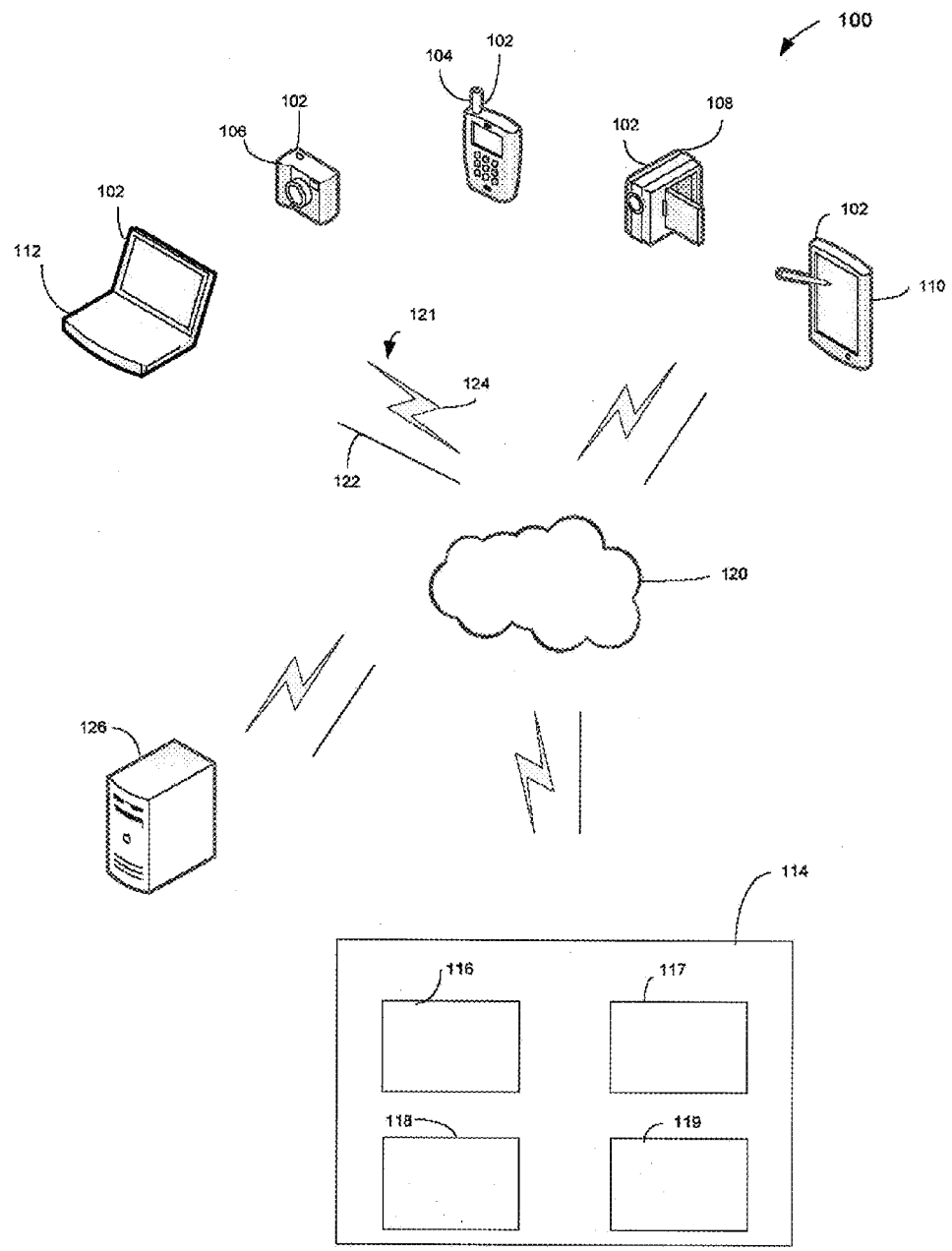
FIG. 1 is a system diagram for extracting and utilizing data from an image.

The present disclosure is directed to systems and methods for extracting and utilizing data from an image, including removal of defects from the image, in the below illustrated embodiments. It is to be appreciated the subject invention is described below more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The methods described herein increase the efficiency of the removal of defects from document images by reorienting the conceptual framework within which an image is filtered. Rather then arbitrarily applying a filter to an entire landscape of a document image, the Applicants have created a methodology by which a document image is separated into regions of darkness and regions of light, or viewed alternatively, regions of darkness and regions of lack of darkness. Filtering is then adaptively applied to each region to remove defects.

In one embodiment, a computer implemented method for adaptive binarization to remove a defect from an image is provided. Image data is received. The image data is grouped in a plurality of components. In the plurality of components, at least a first data type and a second data type are identified. The plurality of components are processed to remove the at least one defect, wherein components belonging to the first data type are processed through employment of a first mode and components belonging to the second data type are processed through employment of a second mode.

In another embodiment, a computer implemented method to remove a defect from an image is provided. An image is received. The image is separated into a plurality of components. The components are analyzed to determine a target component, the target component being the image component that provides an optimal amount of information, relative to the image components, regarding the location of the defect in the image. The target component is analyzed to determine a positional boundary for the defect in the image. Binarization is performed on the image, wherein a first threshold values is used for data within the positional boundary and a second threshold value is used for data outside of the positional boundary.

In another embodiment, a computer implemented method to remove a defect from an image is provided. An image is received. Bit plane slicing is performed on the image to produce a plurality of bit planes. The bit planes are compared to identify a target bit plane, the target bit plane providing a positional boundary of the defect. Binarization is performed on the image to remove the defect.

In another embodiment, a computer implemented method to remove a defect from an image is provided. An image is received. The image is processed to separate the image into at least one defect region and at least one non-defect region. The image is binarized using a first threshold value within the defect region and a second threshold value within the non-defect region.

In another embodiment, a computer implemented method to remove a defect from an image is provided. Image data is received. The image data is processed to separate the image data into a plurality of image data subgroups. A subgroup identifying a defect in the image is selected. The subgroup identifying the defect is utilized to determine a position of the defect within the image data. The image data is binarized such that a first threshold value is used on data at the position and second threshold value is used elsewhere in the data.

Referring to FIG. 1, a hardware diagram depicting a system 100 in which the processes described herein can be executed is provided for exemplary purposes. In one example, system 100 includes at least one instance of an image capture device 102. Exemplary embodiments of image capture device 102 include but are not limited to multifunction "smart phone" 104 including an image capture capability, such as a digital camera. In another example, the image capture device could be a stand alone digital camera 106. In another example, the image capture device 102 could be a standalone video camera (e.g. webcam) 108. In another example, an image capture device 102 could be connected (e.g. wireless or wired) to a computing device, such as a tablet 110 or notebook 112 computer.

Referring further to FIG. 1, system 100 includes at least one instance of data extraction device 114. Data extraction device 114 is a hardware and/or software component residing on a server or computer. In another example, data extraction device 114 is a hardware and/or software component residing on multiple servers. In another example, the data extraction device 114 is a hardware and/or software component residing on image capture device 102.

It should be understood that image capture devices 102 each generally include at least one processor, at least one interface, and at least one memory device coupled via buses. Image capture devices 102 may be capable of being coupled together, coupled to peripheral devices, and input/output devices. Image capture devices 102 are represented in the drawings as standalone devices, but are not limited to such. Each can be coupled to other devices in a distributed processing environment.

It should further be noted that each image capture device 102 and data extraction device 114 may include or be coupled to input devices, such as keyboards, speech recognition systems, mouses, trackballs, joysticks, etc. It is also understood that image capture devices 102 and data extraction device 114 may include or be coupled to output devices, such as speakers, display devices and so forth to allow users to receive output of the processes described herein. Further, image capture devices 102 and data extraction device 114 may be connected to various peripheral devices Data extraction device 114 includes a defect removal engine 116, a data recognition engine 117, memory 118, and a processor 119. Defect removal engine 116 comprises hardware and/or software components programmed to perform defect removal as further set forth herein. Data recognition engine 117 in one example is an optical character recognition ("OCR") engine or program that is utilized to perform optical character recognition on document images. In one embodiment, data recognition engine 117 performs optical character recognition on document images subsequent to their being sent to defect removal engine 116 for removal of defects from document images.

Defect removal engine 116 and data recognition engine 117 contain instructions for controlling processor 119 to execute the methods described herein. Examples of these methods are explained in further detail in the subsequent of exemplary embodiments section-below. The term "engine" is used herein to denote a functional operation that may be embodied either as a stand-alone component or as an integrated configuration of a plurality of subordinate components. Thus, defect removal engine 116 and data recognition engine 117 may be implemented as a single module or as a plurality of modules that operate in cooperation with one another. Moreover, although defect removal engine 116 and data recognition engine 117 are described herein as being implemented as software, they could be implemented in any of hardware (e.g. electronic circuitry), firmware, software, or a combination thereof.

Memory 118 is a computer-readable medium encoded with a computer program. Memory 118 stores data and instructions that are readable and executable by processor 119 for controlling the operation of processor 119. Memory 118 may be implemented in a random access memory (RAM), volatile or non-volatile memory, solid state storage devices, magnetic devices, a hard drive, a read only memory (ROM), or a combination thereof.

Processor 119 is an electronic device configured of logic circuitry that responds to and executes instructions. The processor 119 could comprise more than one distinct processing device, for example to handle different functions within data extraction device 114. Processor 119 outputs results of an execution of the methods described herein. Alternatively, processor 119 could direct the output to a remote device (not shown) via network 120.

It is to be further appreciated that network 120 depicted in FIG. 1 can include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

In one example, image capture devices 102 will include a thin client that will allow the user to take pictures of documents and send the documents to data extraction device 114. Image capture devices 102 and data extraction device 114 communicate over network 120 through one or more communications interfaces 121. Communications interfaces 121 may comprise either wired 122 or wireless 124 interfaces. Image capture devices 102 send document images to data extraction device 114 through one or more interfaces 121. It should be noted, however, that images can also be sent directly or indirectly to the data extraction device 114. For instance, an image could be sent to a cloud or filing sharing site from data extraction device 114 can retrieve the document image. In another example, the image could be provided to the data extraction device 114 through the use of storage media, such as a disc or a flash drive.

Finally, referring further to FIG. 1, system 100 includes one or more computing devices 126 that use the data and images extracted by data extraction device 114 for various business cases. An enterprise could use data extraction device 114 to extract data from documents and then automatically route images of the documents and data contained therein to the proper party in the enterprise for further processing. For example, customers of an insurance company could use image capture devices 102 to take images of documents, such as insurance declaration sheets and send the images to their insurance company. The insurance company could then use data extraction device 114 to extract certain information (e.g. name, coverage limits, policy number, etc.) from the declaration sheet. This information could then be used to automatically route the image of the declaration sheet to the correct party or file within the insurance company for further processing.

It should be understood that computing devices 126 each generally include at least one processor, at least one interface, and at least one memory device coupled via buses. Computing devices 126 may be capable of being coupled together, coupled to peripheral devices, and input/output devices. Computing devices 126 are represented in the drawings as standalone devices, but are not limited to such. Each can be coupled to other devices in a distributed processing environment.

Figure 2:
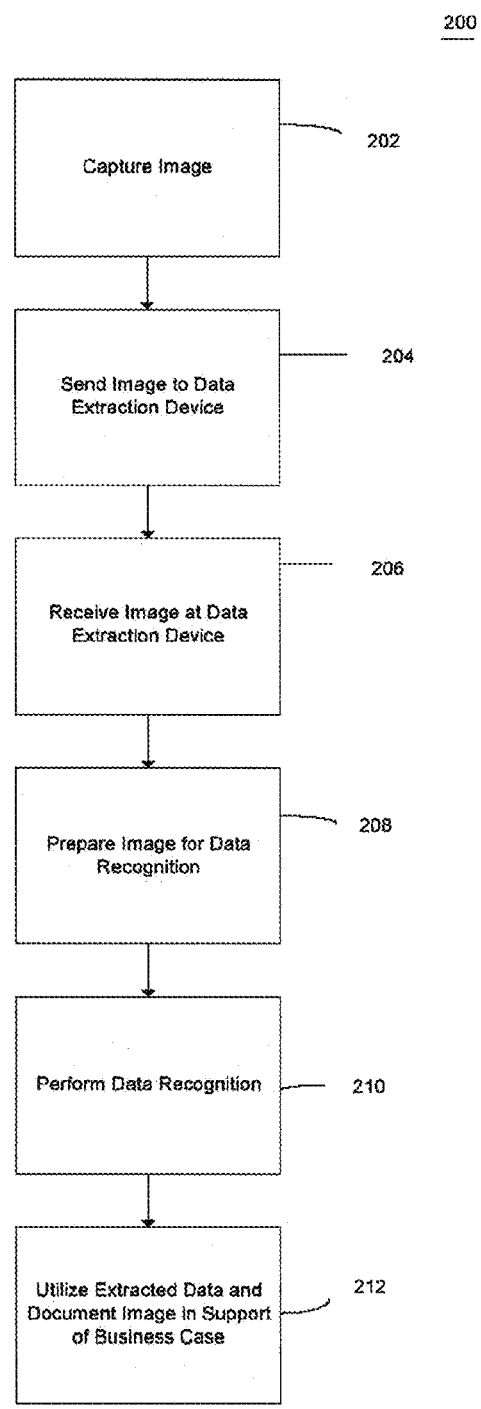
FIG. 2 is a flowchart that illustrates a process of extracting and utilizing data from an image.

Referring to FIG. 2, an exemplary flow diagram depicts a method 200 for extracting and utilizing data from an image. In step 202, an image capture device 102 captures an image. In step 204, the document image is sent to a data extraction device 114 over one or more interfaces 122, 124. In step 206, data extraction device 114 receives the image. Data extraction device 114 passes the image to defect removal engine 116. In step 208, defect removal engine 116 prepares the image for further processing. In one example, defect removal engine 116 prepares the document image for further processing by data recognition engine 117 by removing defects from the image. In one example, the defects are shadows contained in the image when the image capture device 102 captures the image. In another example, the defects are the result of defects within the object of the image (e.g. smudged ink on a document).

The cleaned image (i.e. image with defects removed) is sent to data recognition engine 118 in step 210. Data recognition engine 117 then processes the cleaned image to extract data therein. In step 212 data recognition engine 117 sends the image and/or extracted data to computing devices 126 for further processing to support the business case within the enterprise.

Figure 3:
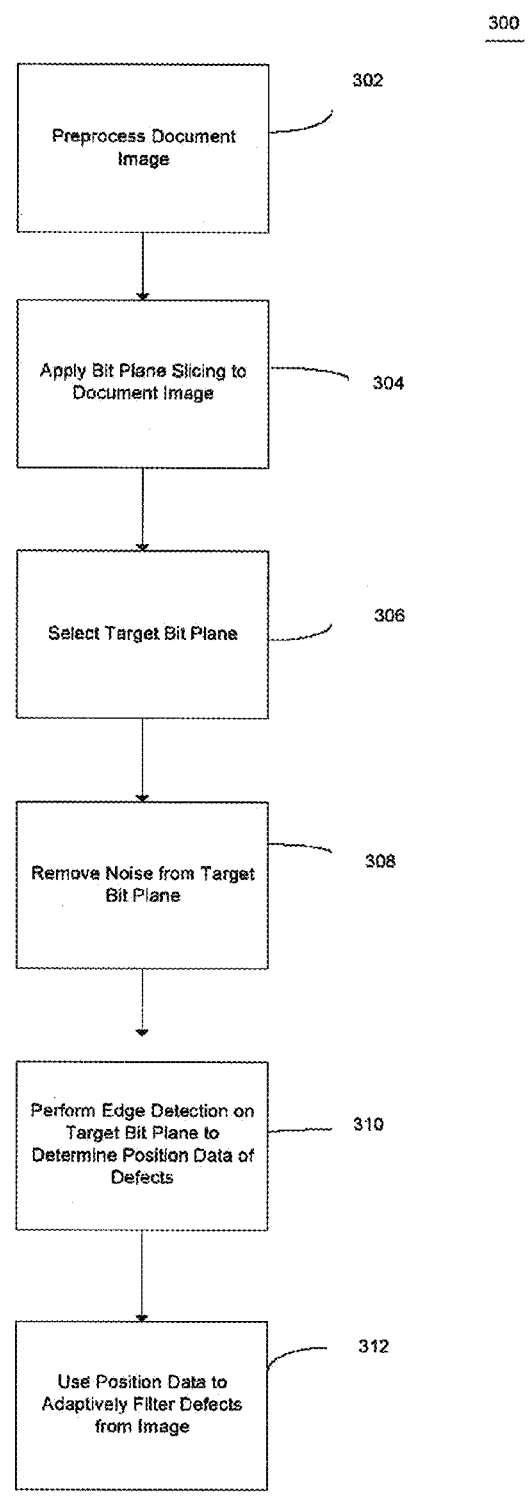
FIG. 3 is a flowchart that illustrates removal of a defect from an image.
Figure 4A:
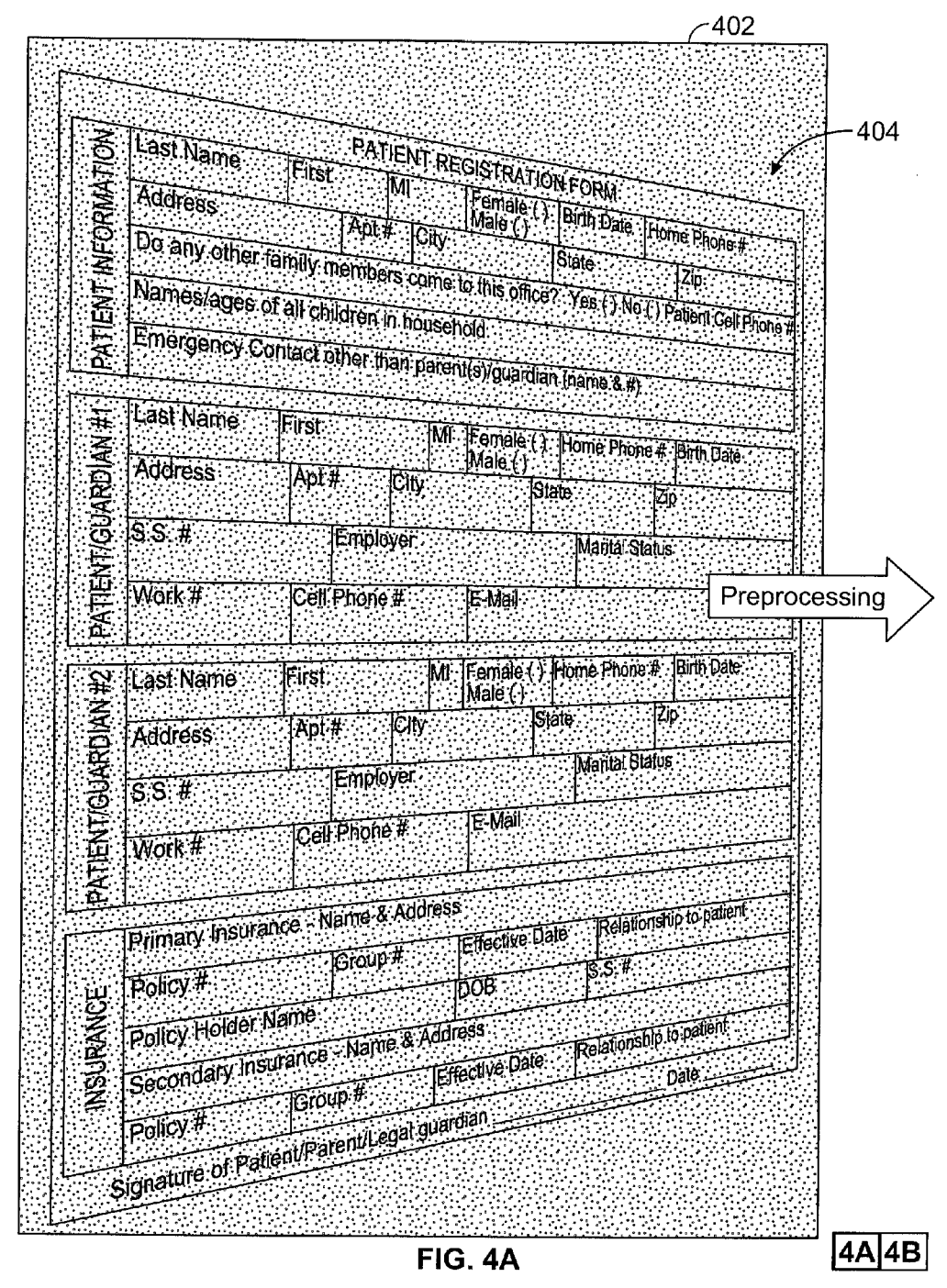

Referring to FIG. 3, an exemplary flow diagram depicts a method 300 by which defect removal engine 116 removes defects from an image. In step 302, defect removal engine 116 preprocesses an image. Referring to FIGS. 4A and 4B, in one example, the image comprises a document image 402. Due to the limitations of image capture devices 102, document images taken from image capture devices do not appear flat (best shown in FIG. 4A). Further, such document images 402 sometimes include objects or background 404 in the periphery of image. FIGS. 4A and 4B depict a pre-processing technique in which document image 402 is processed to dewarp (i.e. make flat) and extract the image 402 from its background 404. The result is designated as 406. In addition, if necessary, preprocessing includes converting the image 402 to a grayscale image. In one example, the image 402 is converted to an 8 bit grayscale image. Furthermore, preprocessing may also include gray level plane extraction from a RGB color band wherein a given band is retrieved from image 402 and that particular band is an 8 bit grayscale image Referring now to FIG. 3, after preprocessing, the data comprising preprocessed image 406 is, in step 304, grouped or divided into subgroups. In one example, these groupings or subgroupings are by formed by dividing the bit groupings for each pixel according to bit position. In one embodiment these groupings are formed through bit plane slicing. Referring to FIGS. 5A to 5H, image 406 is divided into 8 bit planes. Bit Plane 0 (FIG. 5A) contains the most significant bit for each pixel in the image. Bit plane 1 (FIG. 5B) contains the next most significant bit for each pixel in the image 406. Bit plane 2 (FIG. 5C) contains next most significant bit for each pixel in the image 406. Bit plane 3 (FIG. 5D) contains the next most significant bit, after bit plane 2, for each pixel in the image 406. Bit plane 4 (FIG. 5E)_contains the next significant bit, after bit plane 3, for each pixel in the image and so forth. Bit planes 1-3 yield binarized versions of the image 406, but with black blotches 502 and white blotches 504. When compared to image 406, blotches 502, 504 occur in areas where defects, in the form of shadows, are present, as light transitions to dark and vice versa. Therefore, method 300 separates the image 406 into areas of light and darkness or light and absence of light.

Referring now to FIG. 3, in step 306, a target bit plane is selected from image 406. The target bit plane is selected by identifying the bit plane that contains the most actionable information regarding the location of defects in the image 406. For instance, it can be seen from FIGS. 5A to 5H, that bit planes 0-2 (FIGS. 5A to 5C) provide little information about the location of defects within image 406, because they show a minimal number of blotches whereas bit planes 4-7 (FIGS. 5E to 5H) provide too much information because they comprise blotches that are interspersed or collapsed together to the extent that are not recognizable. Accordingly, bit plane 3 (FIG. 5D) is selected as the target bit plane 506. Put another way, bit planes 4-7 contain too much binary noise. Such that that binary noise would interfere with the extraction of defects from image 406. Accordingly, step 306 involves selecting, as the target bit plane, the bit plane with an optimal amount of information regarding the positional boundaries of defects and a minimal amount of binary noise.

Referring further to FIG. 3, once target bit plane 506 is selected, a filtering operation is utilized, in step 308, to remove text from the target bit plane 506. Such filtering is worthwhile because edge detection will be performed in step 310. Edge detection techniques are susceptible to noise and text can be confused with blotches 502, 504 when performing edge detection, and therefore provide inaccurate results as to the positional boundaries of blotches 502, 504.

Figure 6B:
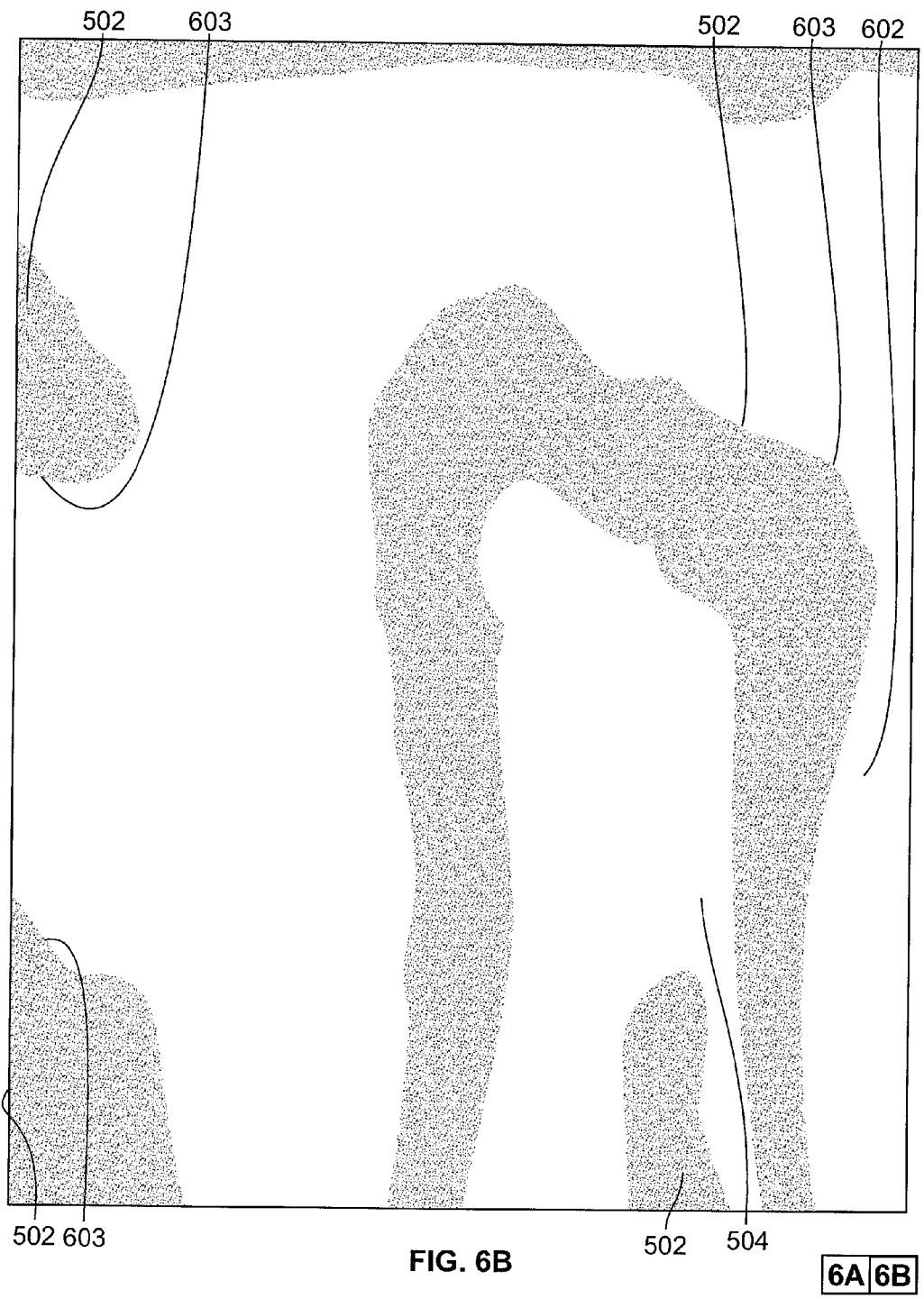

Referring to FIGS. 6A and 6B, one exemplary filtering operation is that may be utilized in step 308 is edge boundary minimization. In one example, edge boundary minimization involves applying a Gaussian Blur to the target bit plane 506. In another example, a Gaussian Blur is applied to target bit plane 506 and the result is then thresholded to binary color constraints. The result is an optimized image 602 in which the boundaries 603 between blotches 502, 504 are clearly defined and text is removed from the image.

Once optimized image 602 is created, an edge detection technique is performed on it, in step 310, to identify the positional data regarding the location or boundaries of blotches 502, 504 within optimized image 603, i.e., the location in image 602 where the discontinuities between light and shade occur. In one example, a technique utilizing adjacent similar color selection is utilized to detect the edges of blotches 502, 504. Adjacent similar color selection selects a value for a pixel based on the value of adjacent pixels around it. Accordingly, pixels that are on the border of blotches 502 that are assigned a dark value, but are predominantly surrounded by pixels having a light value will be assigned as light. Conversely, pixels the border of blotches 504 that are assigned a light values, but are predominately surrounded by pixels having a dark value will be assigned a dark value. In this manner, the borders between blotches 502, 504 can be sharply defined.

Referring now to FIG. 3, in step 310, the position data from the edge detection technique is used to adaptively filter image 406. In one example, adaptive histogram binarization is used on blotches 502, 504 to remove defects. Adaptive histogram binarization uses a threshold value to determine whether a particular pixel should be designated light or dark. Pixels greater than the threshold value are designated light and pixels less than the threshold value are designated dark. In document image 406, text data 508 will have the darkest value due to text generally being darker than shadow. Therefore, within the positional boundaries of the blotches 502, 504, histogram binarization is performed using a lower threshold value than for the rest of the image.

Referring to FIGS. 7A to 7C, image 406 is shown next to image 702. Image 702 (FIG. 7B) is a version of image 406 (FIG. 7A) after a conventional non-adaptive histogram binarization technique is used. Image 702 was filtered using a single threshold value for the entire image 406. Accordingly, image 702 contains a large defect 704 which obscures text. In contrast, image 706 (FIG. 7C) depicts image 406 after undergoing the defect removal process described in FIG. 3. In contrast, image 704 contains minimal defects and the text is not obscured.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer implemented method for adaptive binarization to remove a defect from an image, the method comprising:
receiving image data;
grouping the image data into a plurality of components, wherein each of the components comprises a plurality of bit groupings;
identifying, in the plurality of components, at least a first data type and a second data type; and
processing the plurality of components to remove the at least one defect, wherein each bit group of the first data type is compared to a first threshold value and the bit group is set to a first color value if the number exceeds the first threshold value and the bit group is set to a second color value if the number does not exceed the first threshold value.

2. The computer implemented method of claim 1, wherein the step of processing the plurality of components comprises the step of performing image binarization on the plurality of image components.

3. The computer implemented method of claim 2, wherein the step of performing image binarization comprises selecting a first threshold value for the image components of the first type and selecting a second threshold value for the image components of the second type.

4. The computer implemented method of claim 3, wherein the first threshold value is greater than the second threshold value.

5. The computer implemented method of claim 1, wherein the step of processing comprises comparing each bit group of the second data type to a second threshold value and setting the bit group to the first color value if the number exceeds the second threshold value and setting the bit group to the second color value if the number does not exceed the second threshold value.

6. The computer implemented method of claim 1, wherein the first data type represents an area of relative darkness in the image and the second data type represents an area of relative lightness in the image.

7. A device comprising:
   a processor; and
   a memory coupled with the processor, the memory comprising executable instructions that when executed by the processor cause the processor to effectuate operations comprising:
      receiving image data;
      grouping the image data into a plurality of components, wherein each of the components comprises a plurality of bit groupings;
      identifying, in the plurality of components, at least a first data type and a second data type; and
      processing the plurality of components to remove the at least one defect, wherein each bit group of the first data type is compared to a first threshold value and the bit group is set to a first color value if the number exceeds the first threshold value and the bit group is set to a second color value if the number does not exceed the first threshold value.

8. The device of claim 7, wherein the step of processing the plurality of components comprises a step of performing image binarization on the plurality of image components.

9. The device of claim 8, wherein the step of performing image binarization comprises selecting a first threshold value for the image components of the first type and selecting a second threshold value for the image components of the second type.

10. The device of claim 9, wherein the first threshold value is greater than the second threshold value.

11. The device of claim 7, wherein the step of processing comprises comparing each bit group of the second data type to a second threshold value and setting the bit group to the first color value if the number exceeds the second threshold value and setting the bit group to the second color value if the number does not exceed the second threshold value.

12. The device of claim 7, wherein the first data type represents an area of relative darkness in the image and the second data type represents an area of relative lightness in the image.

13. A computer readable storage medium that is not a signal comprising computer executable instructions that when executed by a computing device cause said computing device to effectuate operations comprising:
   receiving image data;
   grouping the image data into a plurality of components, wherein each of the components comprises a plurality of bit groupings;
   identifying, in the plurality of components, at least a first data type and a second data type; and
   processing the plurality of components to remove the at least one defect, wherein each bit group of the first data type is compared to a first threshold value and the bit group is set to a first color value if the number exceeds the first threshold value and the bit group is set to a second color value if the number does not exceed the first threshold value.

14. The computer readable storage medium of claim 13, wherein the step of processing the plurality of components comprises a step of performing image binarization on the plurality of image components.

15. The computer readable storage medium of claim 14, wherein the step of performing image binarization comprises selecting a first threshold value for the image components of the first type and selecting a second threshold value for the image components of the second type.

16. The computer readable storage medium of claim 15, wherein the first threshold value is greater than the second threshold value.

17. The computer readable storage medium of claim 13, wherein the step of processing comprises comparing each bit group of the second data type to a second threshold value and setting the bit group to the first color value if the number exceeds the second threshold value and setting the bit group to the second color value if the number does not exceed the second threshold value.

18. The computer readable storage medium of claim 13, wherein the first data type represents an area of relative darkness in the image and the second data type represents an area of relative lightness in the image.

* * * * *